J. E. BARROWS.
WIRE CUTTER.
APPLICATION FILED MAR. 31, 1913.
1,181,724.
Patented May 2, 1916.
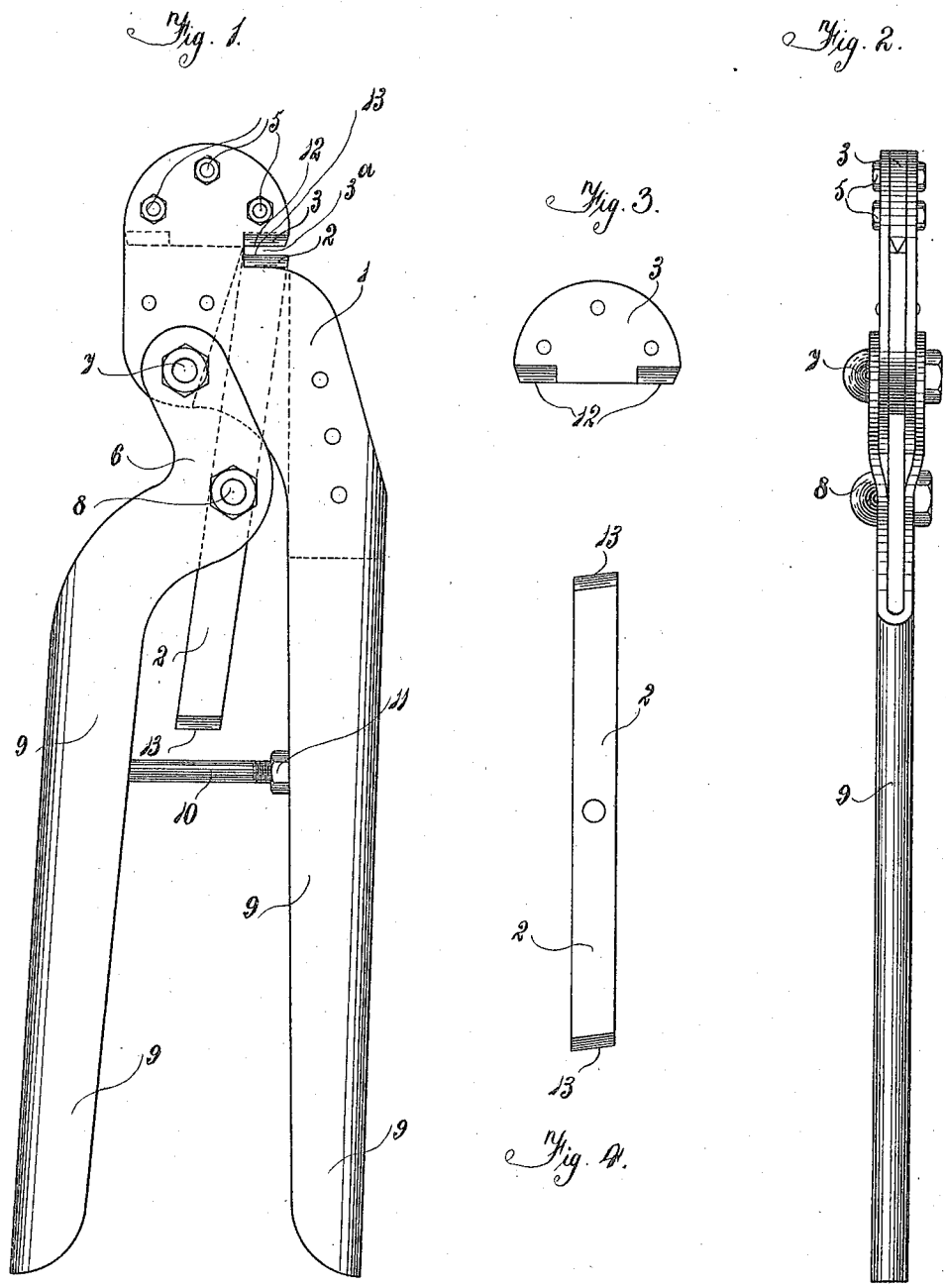
WITNESSES
INVENTOR
J. E. BARROWS
ATTORNEY

UNITED STATES PATENT OFFICE.

JOSEPH ERNEST BARROWS, OF NEAR BIRMINGHAM, ENGLAND.

WIRE-CUTTER.

1,181,724.　　　　　Specification of Letters Patent.　　Patented May 2, 1916.

Application filed March 31, 1913. Serial No. 757,905.

*To all whom it may concern:*

Be it known that I, JOSEPH ERNEST BARROWS, subject of the King of Great Britain, residing at Southfield, Castle Bromwich, juxta Birmingham, in the county of Warwick, England, have invented a new and useful Wire-Cutter; and I do hereby declare the following to be a full, clear, and exact description of the same.

My invention comprises improvements in tools for cutting wire, and refers to that class of such which employs two handles adapted to be gripped in the hand, and each provided with a cutting edge which edges meet together, as distinguished from passing over each other as in shears; the object of the said invention being to provide an improved, more powerful, and cheaper tool which is particularly adapted for cutting metal wire.

According to this invention the cutting blades are made detachable and renewable, one blade being pivotally connected to one of the controlling handles in such manner that it forms substantially a toggle link when the cutter is being operated, great cutting power being thus applied.

Referring to the drawings: Figure 1 is a side elevation of the tool. Fig. 2 is an edge view of same. Fig. 3 illustrates the fixed blade detached. Fig. 4 illustrates the movable blade detached.

In carrying my invention into practice as illustrated upon the accompanying drawings there is a main or body portion 1 which is formed from a blank of sheet metal folded upon itself and to the required shape, the two portions being at a distance apart corresponding with the thickness of the sliding cutter 2 and fixed cutter 3. In this end of the tool there is a side or lateral opening 3ª for admitting the wire to be cut, this opening being provided with a fixed, but detachable cutter 3 secured in place by suitable detachable screws 5, while opposite to this is a central opening for receiving the movable or sliding cutter 2 which consists of a strip of metal having cutting edges at both extremities and being pivotally connected to the controlling handle 6 near its middle.

This handle 6 is pivoted to the body portion at a position as 7 at one side of the lateral opening, from which point it bends toward the opening in such manner that when the handle moves inwardly it imparts a powerful thrust to the movable blade after the manner of a toggle, thus applying a great cutting force.

The sliding blade is retained in position by suitable means, such as distance pieces between the two sheet metal side plates in the body as indicated by the dotted lines, and may be removed by taking out the pivot pin 8, while the fixed blade may be similarly detached by removing the screws 5. The body portion and the handle have similar shanks 9 which are adapted to be gripped in the palm of the hand, the extremities of which are perferably bent inwardly and provided with an adjusting screw 10 and nut 11 which prevents the tool being closed too tightly, and thus forcing one cutting edge against the other.

The fixed cutter 3 has two cutting edges 12 and is of symmetrical form so that if one cutting edge is damaged the cutter may be reversed to provide a new cutting edge; while similarly the movable cutter 2 has two cutting edges 13.

What I claim then is:—

1. In a wire cutter, the combination of a body portion provided with a guide opening and a cutting edge in front of the opening; a handle fixed to the body portion; a movable handle fulcrumed to the body portion; and a cutter bit in said opening and having with the movable handle a connection adapted to give the cutting edge of the bit a combined movement toward and along said first named cutting edge, the center of said guide opening, the fulcrum point of the movable handle and the point of connection between said bit forming an angle greater than 90°, for all positions of the handle, said point of connection being remotely to the rear of said fulcrum point a distance approximately equal to the distance between the fulcrum point and the active part of said guide opening.

2. In a wire cutter, the combination of a body portion provided with a guide opening and a cutting edge in front of the opening; a handle fixed to the body portion; a movable handle fulcrumed to the body portion; and a cutter bit in said opening and having with the movable handle a pivotal connection remotely to the rear of its fulcrumed point whereby the connection is adapted to give the cutting edge of the bit a combined movement toward and along said first named cutting edge, the center of said guide opening, the fulcrum point of the movable handle and the point of connection between said bit forming an angle greater than 90°, for all positions of the handle, said point of connection being remotely to the rear of said fulcrum point a distance approximately equal to the distance between the fulcrum point and the active part of said guide opening.

3. In a wire cutter, the combination of a body portion having a rear fixed handle, elongated guide opening and a rearwardly pointing cutting edge in front of the guide opening; a movable handle fulcrumed to the body portion; and a cutter bit between said handles and having its cutting end received in said guide opening, said bit being pivoted to said movable handle at a point considerably to the rear of said fulcrum point, the center of said guide opening, the fulcrum point of the movable handle and the point of connection between said bit forming an angle greater than 90°, for all positions of the handle, said point of connection being remotely to the rear of said fulcrum point a distance approximately equal to the distance between the fulcrum point and the active part of said guide opening.

4. In a wire cutter, the combination of a body portion terminating rearwardly in a fixed handle and provided at its forward end with a rearwardly disposed cutting edge and having a narrow guide opening opposite said cutting edge; a movable handle fulcrumed to said body portion; and a cutter bit between and approximately parallel to said handles and provided with opposite cutting ends either of which engages in said narrow guide opening, said bit having at its mid point pivotal connection with said movable handle at a point approximately as distant to the rear of the fulcrum of the movable handle as the fulcrum is distant from said opening.

5. In a wire cutter, the combination of a body portion terminating rearwardly in a fixed handle and provided at its outer end with a rearwardly disposed cutting edge and having a guide slot having a narrow opening opposite said edge and a large rear opening; a movable handle pivoted near said large opening; a sliding cutter bit having opposite cutting ends either of which pivotally and slidably engages in said narrow opening for coöperation with said cutting edge, said bit being approximately parallel to and between said handles and pivoted at its mid point to said handle a distance to the rear of the pivot point of the handle approximately equal to the distance between said pivot point and said narrow opening; and a means for limiting the inward movement of the handles and the movement of the operator's hand toward the inactive cutting end of the bit.

6. In a wire cutter, the combination of a body portion having a rear fixed handle, elongated guide opening and a rearwardly pointing cutting edge in front of the guide opening; a movable handle fulcrumed to the body portion; a cutter bit having a pair of cutting ends either of which is received in said opening, said bit having pivotal connection with the movable handle; and a means for limiting the relative inward movement of the handles and holding the operator's hand away from the inactive cutting end of the bit.

7. In a wire cutter, the combination of a body portion terminating rearwardly in a fixed handle and provided at its forward end with a rearwardly disposed cutting edge and having a narrow guide opening opposite said cutting edge; a movable handle fulcrumed to said body portion; a cutter bit between and approximately parallel to said handles and provided with opposite cutting ends either of which engages in said narrow guide opening, said bit having at its mid point pivotal connection with said movable handle at a point approximately as distant to the rear of the fulcrum of the movable handle as the fulcrum is distant from said opening; and a means holding the operator's hand from the rear end of the bit and limiting the inward movement of the handles.

8. In a wire cutter, the combination of a body member terminating at its rear end in a fixed handle and at the other end in a hooked head provided with a rearwardly pointing cutting edge, said body portion being provided with a tapering guide slot extending approximately parallel and adjacent to said handle and tapering to a narrow opening opposite said cutting edge; a movable handle pivoted to said body portion near the larger end of said guide slot on the side opposite to the fixed handle, said movable handle extending approximately parallel to the fixed handle and provided with an elbow portion distant from the pivotal point of the movable handle a distance about equal to the distance between said point and narrow opening; a sliding cutter bit having a cutting edge at each end and disposed in said guide slot and between said handles and pivoted at its middle part to said elbow portion and adapted to have either cutting end fit into said narrow opening to coöperate with said first named cutting edge, and adapted when the handles are relatively moved to have a combined sliding and pivotal movement in said narrow opening; and a means for adjustably limiting the movement of the handles toward each other and the movement of the user's hand toward the inactive cutting edge of the bit.

9. In a wire cutter, the combination of a body member terminating at one end in a fixed handle and at the other end in a hooked head and provided with a guide slot approximately parallel to and adjacent to said handle and tapering to a narrow opening opposite the hooked position of said head, a reversible fixed cutter having two cutting edges and adapted to be fixed to said head with either cutting edge opposite said opening; a movable handle pivoted to said body portion near the larger end of said guide slot on the side opposite to the fixed handle and extending approximately parallel to the fixed handle and provided with an elbow portion distant from the pivotal point of the movable handle a distance about equal to the distance between said point and said narrow opening; a sliding cutter bit having cutting edges at both ends and disposed in said guide slot and between said handles and pivoted at its middle point to said elbow portion and neatly fitting in said narrow opening and adapted to have either cutting edge coöperate with said fixed cutter and adapted when the handles are relatively moved to have a combined sliding and pivotal movement in said guide slot; and an adjusting screw secured to one handle and adjustably limiting the movement of the handles toward each other and holding the hand of the user from contact with the inactive cutting edge of the sliding cutter.

In testimony whereof, I have signed my name to this specification in the presence of two subscribing witnesses.

JOSEPH ERNEST BARROWS.

Witnesses:
HAROLD C. FORRESTER,
ARNOLD S. ILLSTON.

Copies of this patent may be obtained for five cents each, by addressing the "Commissioner of Patents, Washington, D. C."